C. J. AND W. A. WAY.
MECHANICAL INDICATOR.
APPLICATION FILED NOV. 17, 1919.
1,352,855.
Patented Sept. 14, 1920.
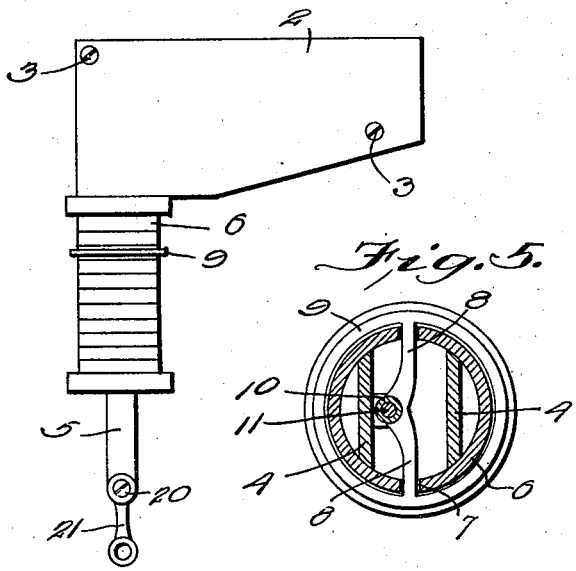
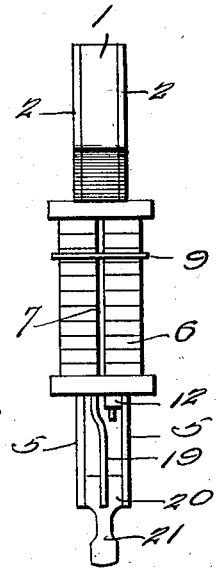
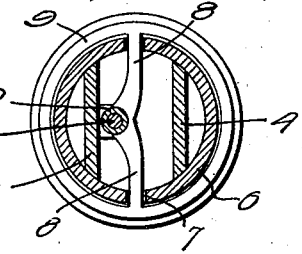
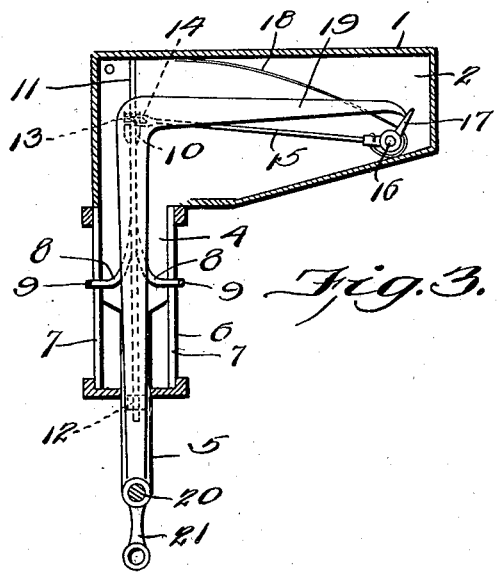
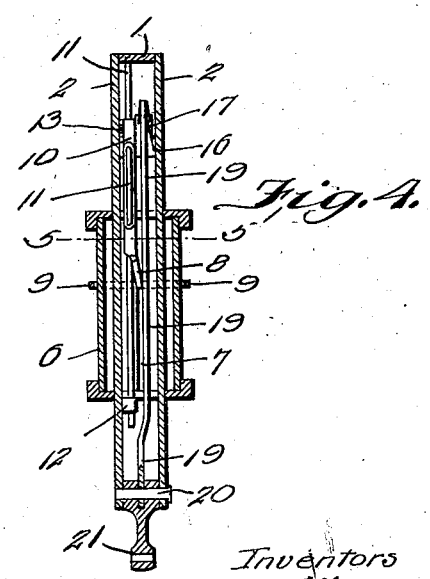
Inventors
Clarence John Way
Wilbur A. Way,
By
Attorneys
Witness

UNITED STATES PATENT OFFICE.

CLARENCE JOHN WAY AND WILBUR ALERTON WAY, OF CLEVELAND, OHIO.

MECHANICAL INDICATOR.

1,352,855.

Specification of Letters Patent. Patented Sept. 14, 1920.

Application filed November 17, 1919. Serial No. 338,717.

*To all whom it may concern:*

Be it known that we, CLARENCE JOHN WAY and WILBUR A. WAY, citizens of the United States, residing at Cleveland, in the county of Cuyahoga and State of Ohio, have invented a new and useful Improvement in Mechanical Indicators, of which the following is a specification.

The object of our invention is to provide an improved mechanical indicator or measuring instrument suited for rapidly and accurately recording fine measurements, and adapted for use by machinists, tool makers, gage makers and so forth.

It is further our object to provide a novel reciprocating indicating ring movable longitudinally over or inside a cylinder bearing measurement markings and actuated by a novel arrangement of levers and springs.

We attain the objects of our invention by the mechanism illustrated in the accompanying drawings, in which—

Figure 1 is a side elevation of the invention;

Fig. 2 is an end elevation;

Fig. 3 is a longitudinal section with parts of the device shown in side elevation;

Fig. 4 is a transverse section with parts of the device shown in end elevation; and Fig. 5 is a horizontal section on line 5—5 of Fig. 4.

Like numerals designate like parts in each of the views.

Referring to the accompanying drawings, we provide a main casing 1 to which side plates 2 are suitably secured, as by screws 3. Side plates 2 are provided with plate extensions 4 which terminate in reduced plate extensions 5, thus providing plate members of substantially L-shape. Mounted on plate extensions 4 we provide a cylinder 6, bearing suitable measurement markings, preferably arranged annularly as illustrated. Cylinder 6 is provided with longitudinal slots 7, through which project opposed arms 8 on which is mounted the indicating ring 9.

As illustrated in Fig. 5 arms are mounted on the sleeve 10 which is reciprocally mounted on rod 11, which latter member is rigidly mounted in casing 1 and bearing 12 as illustrated in Figs. 3 and 4.

As shown in Fig. 4 we provide a lateral pin 13 on sleeve 10. Pin 13 is engaged by the bifurcated end 14 of bell-crank lever 15 mounted on a suitable pivot 16 and having the inner face of the short arm 17 in contact with the end of the L-shaped lever 19, as clearly shown in Fig. 3. We provide a suitable fine tension spring 18 having one end secured to the long arm of bell-crank 15, and having its other end pressing against the casing 1. The normal position of indicating ring 9 is at the lower end of the marked cylinder 6. L-shaped lever 19 has its lower end operatively attached to arm 21. The actuating measurement arm 21 is mounted between members 5 by screw 20.

In operating the invention, the actuating measurement arm 21 is moved to the extent to which the measurement is made, thus operating actuating L-shaped arm 19, the free end of which is in contact with the face of the short arm 17 of bell-crank lever 15, which is normally held in contact with it by tension spring 18. The actuation of the lever 15 in turn actuates sleeve 10, which carries pin 13.

It is within our contemplation to make such minor changes in the means for mounting the various parts and their position as will not substantially depart from the novel combination and arrangement of parts disclosed in the foregoing specification and the accompanying drawings.

The device is designed for use where fine measurements are required and is especially advantageous in permitting the measurement markings being read from any portion of the indicating cylinder 6 without requiring the use of a mirror as has heretofore been necessary with certain fine measurement instruments designed for similar work. With our mechanical indicator the reading may be taken easily at various positions which can not be accomplished with the present types of measuring instruments and indicators.

What we claim is:

1. In measuring instruments, the combination of a cylinder bearing measurement markings, said cylinder having longitudinal slots, an indicating ring slidable longitudinally over said cylinder, arms on which the ring is mounted, said arms extending through the slots, a movable sleeve on which the arms are mounted, a bell crank lever operatively connected at one end with the aforesaid sleeve, an actuating arm, an L-shaped lever having one end in contact with the other arm of the aforesaid bell crank lever, and having its other end operatively connected with said actuating arm, resilient means normally holding said bell crank lever in contact with the end of the L-shaped lever, and a casing for the levers and resilient means.

2. In a mechanical indicator, the combination of a cylinder bearing measurement markings, an indicating ring encircling said cylinder and spaced therefrom and freely reciprocable longitudinally thereto, means for mounting said ring in spaced relation to the said indicating cylinder, a plurality of pivoted levers operatively connected with the indicating ring to actuate same, a spring normally holding said levers in operative relation, casing for the lever, and an actuating arm operatively connected with one of the aforesaid levers, substantially for the purposes hereinbefore described.

CLARENCE JOHN WAY.
WILBUR ALERTON WAY.